US012595388B2

(12) United States Patent
Bohling et al.

(10) Patent No.: US 12,595,388 B2
(45) Date of Patent: Apr. 7, 2026

(54) AQUEOUS DISPERSION OF CERIUM (III) CARBONATE PARTICLES

(71) Applicants: THE REGENTS OF THE UNIVERSITY OF CALIFORNIA, Berkeley, CA (US); Rohm and Haas Company, Collegeville, PA (US)

(72) Inventors: James C. Bohling, Collegeville, PA (US); Juan F. Callejas, Collegeville, PA (US); Alexander Katz, Berkeley, CA (US); Manish K. Mishra, Berkeley, CA (US); Antony K. Van Dyk, Blue Bell, PA (US)

(73) Assignees: THE REGENTS OF THE UNIVERSITY OF CALIFORNIA, Berkley, CA (US); Rohm and Haas Company, Collegeville, PA (US)

( * ) Notice: Subject to any disclaimer, the term of this patent is extended or adjusted under 35 U.S.C. 154(b) by 664 days.

(21) Appl. No.: 17/906,697

(22) PCT Filed: Feb. 9, 2021

(86) PCT No.: PCT/US2021/017184
§ 371 (c)(1),
(2) Date: Sep. 19, 2022

(87) PCT Pub. No.: WO2021/188228
PCT Pub. Date: Sep. 23, 2021

(65) Prior Publication Data
US 2023/0159782 A1      May 25, 2023

Related U.S. Application Data

(60) Provisional application No. 62/992,411, filed on Mar. 20, 2020.

(51) Int. Cl.
| | |
|---|---|
| *C09D 17/00* | (2006.01) |
| *C09C 1/00* | (2006.01) |
| *C09C 3/08* | (2006.01) |
| *C09C 3/10* | (2006.01) |

(52) U.S. Cl.
CPC .............. *C09D 17/004* (2013.01); *C09C 1/00* (2013.01); *C09C 3/08* (2013.01); *C09C 3/10* (2013.01); *C09D 17/001* (2013.01); *C01P 2004/62* (2013.01); *C01P 2004/64* (2013.01)

(58) Field of Classification Search
CPC ...................................................... C09C 1/00
See application file for complete search history.

(56) References Cited

U.S. PATENT DOCUMENTS

| | | | |
|---|---|---|---|
| 3,692,732 A | 9/1972 | Bruno | |
| 3,960,589 A | 6/1976 | Morrison | |
| 5,204,398 A | 4/1993 | Cohen | |
| 5,478,550 A | 12/1995 | Suzuki | |
| 7,005,404 B2 | 2/2006 | He | |
| 7,473,408 B2 | 1/2009 | Noh | |
| 2004/0152017 A1 | 8/2004 | Rakesh | |
| 2007/0107318 A1 | 5/2007 | Oh | |
| 2007/0243391 A1 | 10/2007 | Varaprasad | |
| 2008/0138267 A1 | 6/2008 | Yadav | |
| 2008/0138272 A1 | 6/2008 | Ohmori | |
| 2010/0331483 A1 | 12/2010 | Briehn | |
| 2011/0009552 A1 | 1/2011 | Criniere | |
| 2011/0244237 A1 | 10/2011 | Cho | |
| 2012/0039827 A1 | 2/2012 | Chaudhuri | |
| 2012/0107604 A1 | 5/2012 | Aruga | |
| 2012/0258154 A1 | 10/2012 | Pfluecker | |
| 2012/0321682 A1 | 12/2012 | Bragado | |
| 2013/0196167 A1* | 8/2013 | Kataoka | C09D 7/67 106/287.18 |
| 2017/0333320 A1* | 11/2017 | Carnali | A61Q 5/02 |
| 2017/0342271 A1 | 11/2017 | Murakami | |
| 2018/0013159 A1 | 1/2018 | Wakabayashi | |
| 2020/0339435 A1 | 10/2020 | Katz | |

FOREIGN PATENT DOCUMENTS

| | | |
|---|---|---|
| CN | 102161497 A | 8/2011 |
| CN | 107111023 A | 8/2017 |
| CN | 109321027 A | 2/2019 |
| CN | 109467693 A | 3/2019 |
| JP | H06145026 | 5/1994 |
| JP | 2002294175 A | 10/2002 |
| JP | 5406555 B2 | 2/2014 |
| KR | 20080046913 | 5/2008 |
| TW | I399412 B | 6/2013 |
| TW | 201728674 A | 8/2017 |
| WO | 2012020729 A1 | 2/2012 |
| WO | 2014100373 | 6/2014 |
| WO | 2020180441 | 9/2020 |

OTHER PUBLICATIONS

Mishra et al., "Tandem Catalytic Antioxidant Nanoparticles Comprising Cerium Carbonate and Photoactive Metal Oxides", ACS Applied Nano Materials, 2021, 4(11) (Year: 2021).*
Gulati et al., AIP Conf. Proc. 2018, 1953, 030214 (Year: 2018).*
"Sol (colloid)", Wikipedia, (Dec. 14, 2018), URL: https://en.wikipedia.org/w/index.php?title=Sol_(colloid)&oldid=873658588, XP055859274.
Wikipedia, Titanium dioxide, (Mar. 19, 2020), pp. 2-3, URL: https://en.wikipedia.org/w/index.php?titte=Titanium_dioxide&o!did=946371942, (Apr. 5, 2021), XP055858731.
Deng, Shunyang et al., "Handbook of Chemical Formulation and Processing", pp. 333-334, Shanghai: Shanghai Scientific and Technological Literature Press, Jan. 31, 2003.

(Continued)

*Primary Examiner* — Amber R Orlando
*Assistant Examiner* — Ryan Patrick Loughran
(74) *Attorney, Agent, or Firm* — Riverside Law LLP

(57) ABSTRACT

The present invention relates to a composition comprising an aqueous dispersion of cerium (III) carbonate particles having a z-average particle size in the range of from 5 nm to 500 nm, which composition further comprises a capping ligand. The composition is useful as an additive in formulations that contain polymer, pigments, dyes, or tints, or a combination thereof, to promote color retention and attenuate unwanted color formation in coatings formed from these formulations.

6 Claims, No Drawings

(56)　　　　　References Cited

OTHER PUBLICATIONS

Liu, Jiping et al., "Nanotechnology in Textile Science"), p. 110, China Textile & Apparel Press, May 31, 2003.

Adachi et al., "The Binary Rare Earth Oxides," Chem. Rev. 1998, 98:1479-1514.

Baldim et al., "The enzyme-like catalytic activity of cerium oxide nanoparticles and its dependency on Ce3+ surface area concentration," Nanoscale, 2018, 10:6971-6980.

Benamira et al., "Gadolinia-doped ceria mixed with alkali carbonates for solid oxide fuel cell applications: I. A thermal, structural and morphological insight," Journal of Power Sources, 2011, 196:5546-5554.

Ferreira et al., "Intrinsic and extrinsic compositional effects in ceria/carbonate composite electrolytes for fuel cells," International Journal of Hydrogen Energy, 2011, 36:3704-3711.

Jain et al., "Role of salt phase in GDC and alumina-based composites," Ionics, 2010, 16:487-496.

Li et al., "Effective ionic conductivity of a novel intermediate-temperature mixed oxide-ion and carbonate-ion conductor," J. Electrochem. Soc., 2011, 158:B225-B232.

Liu et al, "Precipitation and characterization of cerous carbonate," J. Cryst. Growth, 1999, 206:88-92.

Molla et al., "Facile synthesis and structural analysis of graphene oxide decorated with iron-cerium carbonate for visible-light driven rapid degradation of organic dyes." Journal of Environmental Chemical Engineering, vol. 6 (2018), pp. 2616-2626. Available online as of Apr. 6, 2018.

Montini et al., "Fundamentals and Catalytic Applications of CeO2-Based Materials," Chem. Rev., 2016, 116:5987-6041.

Wang et al. "Novel core-shell SDC/amorphous Na2CO3 nanocomposite electrolyte for low-temperature SOFCs," Electrochemistry Communications, 2008, 10:1617-1620.

Wang et al., "Ceria-based nanocomposite with simultaneious proton and oxygen ion conductivity for low-temperature solid oxide fuel cells," Journal of Power Sources, 2011, 196:2754-2758.

Xu et al., Template-free synthesis of mesoporous CeO2 powders by integrating bottom-up and top-down routes for acid orange 7adsorption. RSC Adv. (2015), 5, 44828-44834 (published May 12, 2015).

Zhai et al, "Preparation, characterization and photocatalytic activity of CeO2 nanocrystalline using ammonium bicarbonate as precipitant," Mater. Lett., 2007, 61:1863-1866.

Zhu, "Functional ceria-salt-composite materials for advanced ITSOFC applications," Journal of Power Sources, 2003, 114:1-9.

Coatings World, Evonik Supplies Methacrylate Phosphate as Anti-Corrosion Agent, Flame retardant, 2018 (Year: 2018) 1 page.

Stoye et al., Paints and Coatings, 2006, Ullmann's Encyclopedia of Industrial Chemistry, p. 1-199 (Year: 2006).

TW 201728674 A machine translation (Year: 2017) 15 pages.

CN109321027A machine translation (Year: 2019), 13 pages.

Westerback et al., Ethylene-diamine-tetra(methylene-phosphonic) Acid, Aug. 11, 1956, Nature, 178, p. 321-322 (Year: 1956).

* cited by examiner

AQUEOUS DISPERSION OF CERIUM (III) CARBONATE PARTICLES

CROSS-REFERENCE TO RELATED APPLICATIONS

This application is a U.S. '371 National Stage Entry of PCT application No. PCT/US21/17184, filed Feb. 9, 2021, which claims priority to U.S. Provisional Application No. 62/992,411, filed Mar. 20, 2020, all of which are incorporated by reference herein in their entireties.

BACKGROUND OF THE INVENTION

A paint coated substrate that retains a fresh appearance over an extended period of time is desirable in the field of exterior paints. This "freshly painted" appearance can be measured by three interrelated properties: Dirt-pickup resistance (DPUR), gloss retention, and tint retention. Of these, tint retention is of particular prominence because darker and deeper colors have become more in vogue for exterior applications.

The loss of tint retention, also known as color fade, is believed to be caused by mediated photocatalytic polymer and colorant degradation by $TiO_2$, which is used as an opacifying pigment in most paint formulations. $TiO_2$ particles absorb UV light and, in the presence of water, generate highly reactive hydroxy radicals, which reactively degrade the polymer backbone and colorants, thereby causing gloss reduction, color fading, and unwanted color formation.

Attempts to mitigate degradation of exterior coatings have largely been achieved by using UV absorbers to prevent radical formation by blocking UV light, and antioxidants to quench radicals before polymer or colorant degradation occurs. Unfortunately, UV absorbers require a path length that is long enough for absorption to occur and are therefore only effective in clear (that is, non-$TiO_2$-containing) topcoats. Antioxidants such as hindered amines, hindered phenols, carbon-centered radicals, phosphites, and sulfides leave undesirable film formation and therefore offer only short-term protection when effective. Accordingly, it would be advantageous in the field of exterior coatings to discover a more efficient way to achieve color retention and reduce unwanted color formation in coated surfaces.

SUMMARY OF THE INVENTION

The present invention addresses a need in the art by providing a composition comprising an aqueous dispersion of cerium (III) carbonate particles having a z-average particle size in the range of from 5 nm to 500 nm, which composition further comprises a capping ligand, which is an amine carboxylic acid or a salt thereof, an amine phosphonic acid or a salt thereof, or a polymer functionalized with carboxylic acid groups or a salt thereof.

DETAILED DESCRIPTION OF THE INVENTION

In a first aspect, the present invention is a composition comprising an aqueous dispersion of cerium (III) carbonate particles having a z-average particle size in the range of from 5 nm to 500 nm. The dispersion preferably further comprises a capping ligand, which is an amine carboxylic acid or a salt thereof, an amine phosphonic acid or a salt thereof, or a polymer functionalized with carboxylic acid groups or a salt thereof. The capping ligand is believed to stabilize the particles against agglomeration.

In another aspect, the present invention is a method for preparing an aqueous dispersion of nanosized cerium (III) carbonate particles comprising the step of admixing in water a) a water-soluble ammonium cerium (III) salt, b) a water-soluble carbonate, and c) a capping ligand which is an amine carboxylic acid or a salt thereof, an amine phosphonic acid or a salt thereof, or a polymer functionalized with carboxylic acid groups or a salt thereof wherein the relative proportions of a), b), and c), are such that the resultant z-average particle size of the cerium (III) carbonate particles is in the range of from 5 nm to 500 nm.

As used herein, "nanosized cerium (III) carbonate particles" refer to cerium (III) carbonate particles having a z-average particle size of not greater than 500 nm as measured by dynamic light scattering. The term "nanodispersion" refers to the aqueous dispersion of the nanosized cerium (III) carbonate particles. In another aspect, the nanosized cerium (III) carbonate particles have a z-average particle size of not greater than 300 nm; in another aspect, not greater than 200 nm; and in another aspect, not less than 50 nm.

As used herein, "water-soluble ammonium cerium (III) salt" refers to an ammonium cerium (III) salt that is at least 10% soluble in water in the proportions used. A preferred water-soluble ammonium cerium (III) salt is ammonium cerium (III) nitrate. Similarly, the term "water-soluble carbonate" refers to an alkali metal or ammonium carbonate or bicarbonate salt that is at least 10% soluble in water in the proportions used. Examples of water-soluble carbonates include sodium carbonate, potassium carbonate, ammonium carbonate, sodium bicarbonate, and potassium bicarbonate, with ammonium carbonate being preferred.

As used herein, an "amine carboxylic acid" is a compound that comprises at least one amine group and at least one carboxylic acid group. Preferably, the amine carboxylic acid is an amino acetic acid or a salt thereof; preferably, the amino acetic acid comprises at least two carboxylic acid groups; more preferably, the amino acetic acid is an amine di-, tri-, or tetraacetic acid, examples of which include ethylene diamine tetraacetic acid (EDTA), ethylene diamine diacetic acid (EDDA), and nitrolotriacetic acid (NTA).

A polymer functionalized with carboxylic acid groups may be a homopolymer arising, for example, from the homopolymerization of a carboxylic acid containing monomer, such as acrylic acid, or a copolymer arising from the copolymerization of a carboxylic acid containing monomer and one or more additional monomers, which need not be carboxylic acid functionalized. An example of a homopolymer functionalized with carboxylic acid groups is polyacrylic acid (PAA).

An "amine phosphonic acid" refers to a compound that comprises at least one amine group and at least one phosphonic acid group. The capping ligand may include one or more phosphonic acid and one or more carboxylic acid groups, and salts thereof. Examples of amine phosphonic acids include aminotrimethyl phosphonic acid (ATMP), 6-amino-2-[bis(carboxymethyl)amino]hexanoic acid, and N-(Phosphonomethyl)iminodiacetic acid (PIDA).

The water-soluble ammonium cerium (III) salt, preferably ammonium cerium (III) nitrate, the water-soluble carbonate salt, preferably ammonium carbonate, and the capping ligand are advantageously admixed together in water at a pH in the range from 8, preferably from 9, to 12, preferably to 11, under conditions sufficient to produce the nanodispersion of cerium (III) carbonate particles. The mole:mole ratio of the water-soluble ammonium cerium (III) salt to the water-soluble carbonate is preferably in the range of from 2:1, more preferably from 1:1 to preferably 1:20; more preferably to 1:10; the mole:mole ratio of the water-soluble ammonium cerium (III) salt to the capping ligand is preferably in the range of from 50:1, more preferably from 30:1 to 1:1. The reaction is generally carried out at or around ambient temperature and the reaction is generally complete within an hour.

In another aspect, the present invention is a method for preparing an aqueous dispersion of nanosized cerium (III) carbonate particles comprising the step of admixing in water a) a water-soluble ammonium cerium (III) salt, b) a water-soluble carbonate, and c) a capping ligand which is an amine carboxylic acid or a salt thereof, an amine phosphonic acid or a salt thereof, or a polymer functionalized with carboxylic acid groups or a salt thereof; wherein the relative proportions of a), b), and c), are such that the resultant z-average particle size of the cerium (III) carbonate particles is in the range of from 5 nm to 500 nm.

The concentration of the cerium (III) carbonate in water is preferably in the range of from 0.2, more preferably from 0.5, and most preferably from 1 weight percent, to 25, more preferably to 21 weight percent, based on the weight of the water and the cerium (III) carbonate. More typically, the concentration of the reactants are adjusted to form a final dispersion that is from 1 to 5 weight percent solids; a higher solids content composition can be prepared by centrifugation followed by removal of the supernatant or by in vacuo water removal.

In another aspect, the present invention is a composition comprising a polymer and cerium (III) carbonate particles. In this aspect, the polymer preferably forms a solution or a dispersion with a liquid. In one embodiment of this aspect of the invention, the composition is an aqueous dispersion of polymer particles (a latex) and cerium (III) carbonate particles. In this aspect the particle size of the dispersed cerium (III) carbonate particles is not limited. Larger cerium (III) carbonate particles, especially particles having a z-average particle size as measured by DLS in the range of from 2 μm to 20 μm can be prepared substantially as described above, but without a capping ligand.

The composition comprising the latex and the cerium (III) carbonate particles is useful in the field of coating compositions, especially coating compositions comprising pigments or colorants or both. Pigments include opacifying pigment and extenders. Opacifying pigments include $TiO_2$, $BaSO_4$, and organic hollow sphere polymer particles (HSPs). The $TiO_2$ may anatase or rutile, and passivated or unpassivated. Commercial examples of $TiO_2$ are Ti-Pure-R706 $TiO_2$ and DeGussa P25 $TiO_2$ photocatalyst. The composition may include a combination of anatase and rutile, passivated and unpassivated $TiO_2$.

Suitable extenders include carbonates, silica, silicates, aluminosilicates, phosphates, and non-hollow organic microspheres. More particular examples of extenders include talc, clay, mica, sericite, $CaCO_3$, nepheline, feldspar, wollastonite, kaolinite, dicalcium phosphate, and diatomaceous earth.

Colorants may be organic or inorganic, dispersible (tints) or soluble (dyes). Examples of suitable colorants include methylene blue, phthalocyanine blue, phthalocyanine green, monoarylide yellow, diarylide yellow, benzimidazolone yellow, heterocyclic yellow, DNA orange, pyrrol orange, quinacridone magenta, quinacridone violet, dioxazine violet, quinacridone red, naphthol red, pyrrol red, metallized azo reds, nonmetallized azo reds, carbon black, lampblack, black iron oxide, yellow iron oxide, brown iron oxide, and red iron oxide.

In another aspect, the present invention is a composition comprising a polymer such as poly(methyl methacrylate) (PMMA) dissolved in a solvent such as chloroform in the presence of the dispersed cerium (III) carbonate particles. The composition of this aspect of the present invention is useful, for example, for casings for automotive headlights.

In another aspect, the present invention is a composition comprising cerium (III) carbonate particles and a neat polymer. Such a composition may be prepared by mixing cerium (III) carbonate particles with an extruded polymer melt.

Examples of suitable polymers include polyacrylates, poly(styrene-acrylates), polystyrene, polyvinyl acetate, polyurethane, poly(vinyl acetate-acrylates), silicone, epoxy resins, polyolefins, cellulose, and polysilicates.

Cerium (III) carbonate nanosized dispersions are especially useful in applications such as latex paint formulations where color and gloss retention are desirable.

EXAMPLES 1-4

Preparation of an Aqueous Nanodispersion of Cerium (III) Carbonate Particles In the following examples z-average particle size was determined by dynamic light scattering.

Example 1

Preparation of an Aqueous Dispersion of Nanosized Cerium (III) Carbonate Particles Stabilized by EDTA An aqueous solution of ammonium cerium (III) nitrate tetrahydrate (2 g in 100 mL DI water) was added to a 250-mL plastic vial. EDTA (50 mg) and ammonium carbonate (1 g) were separately dissolved in water (50 mL), then added over 25 s to the solution of ammonium cerium (III) nitrate tetrahydrate with stirring (600 rpm) for 10 min. The pH of mixture was observed to be 8.0±0.3.

The product mixture was divided into four 40-mL centrifugation tubes whereupon centrifugation was performed at 20,000 rpm for 6 min. The white product in each tube was collected and washed with 25 mL water, including 5 min vortex-mixing, to ensure removal of soluble nitrates and excess ammonium carbonate. The final product after washing and centrifugation was obtained as a wet paste having solid content of 20 wt. %.

To study the effect of loading of EDTA on cerium (III) carbonate properties, the example was repeated twice, using 100 mg and 500 mg of EDTA. The z-average particle size of the cerium carbonate particles was found to be 125 nm (50 mg EDTA), 118 nm (100 mg EDTA), and 114 nm (500 mg EDTA).

Example 2

Preparation of an Aqueous Dispersion of Nanosized Cerium (III) Carbonate Particles Stabilized by NTA The procedure described in Example 1 was substantially followed except that NTA (65 mg) was used as the capping ligand instead of EDTA. The final product after washing and centrifugation was obtained as a wet paste having solid content of 20 wt. %.

US 12,595,388 B2

5

The example was repeated 32.5 mg of NTA. The z-average particle size of the cerium carbonate particles was found to be 157 nm (32.5 mg NTA) and 115 nm (65 mg NTA).

Example 3

Preparation of an Aqueous Dispersion of Nanosized Cerium (III) Carbonate Particles Stabilized by PIDA An aqueous solution of ammonium cerium (III) nitrate tetrahydrate (2 g in 100 mL DI water) was added to a 250-mL plastic vial. PIDA (72 mg) and ammonium carbonate (1 g) were separately dissolved in water (50 mL), then added over 25 s to the solution of ammonium cerium (III) nitrate tetrahydrate with stirring (600 rpm) for 10 min. The pH of mixture was observed to be 8.0±0.3.

The product mixture was divided into four 40-mL centrifugation tubes whereupon centrifugation was performed at 20,000 rpm for 6 min. The white product in each tube was collected and washed with 25 mL water, including 5 min vortex-mixing, to ensure removal of soluble nitrates and excess ammonium carbonate. The final product after washing and centrifugation was obtained as a wet paste having solid content of 20 wt. %. The z-average particle size of the cerium carbonate particles was found to be 105 nm.

Example 4

Preparation of an Aqueous Dispersion of Nanosized Cerium (III) Carbonate Particles Stabilized by PAA An aqueous solution of ammonium cerium (III) nitrate tetrahydrate (2 g in 100 mL DI water) was added to a 250-mL plastic vial. PAA (500 mg of 50% aq.; MW=2000 g/mol;) and ammonium carbonate (1 g) were separately dissolved in water (50 mL), then added over 25 s to the solution of ammonium cerium (III) nitrate tetrahydrate with stirring (600 rpm) for 10 min. The pH of mixture was observed to be 8.0±0.3.

The product mixture was divided into four 40-mL centrifugation tubes whereupon centrifugation was performed at 20,000 rpm for 6 min. The white product in each tube was collected and washed with 25 mL water, including 5 min vortex-mixing, to ensure removal of soluble nitrates and excess ammonium carbonate. The final product after washing and centrifugation was obtained as a wet paste having solid content of 20 wt. %.

The example was repeated twice, using 1.1 g and 2.2 g of 50% aq. PAA. The z-average particle size of the cerium carbonate particles as determined by dynamic light scattering (DLS) was found to be 105 nm (0.5 g PAA), 105 nm (1.1 g PAA), and 20 nm (2.2 g NTA).

EXAMPLES 5-7

Preparation of Coatings Formulations with Dyes and Tints

In the following preparations, the acrylic binder has the following characteristics: (49BA/50MMA/1MAA), z-average particle size=98 nm, solids content 40.2 wt. %.
Preparation of Paint Formulations with Dyes:
Two separate dispersions were prepared as follows:
A. Ti-Pure-R706 TiO$_2$ (3.5 g), optionally 10% DeGussa P25 TiO$_2$ photocatalyst based on the weight of Ti-Pure-R706 TiO$_2$, TAMOL™ 1124 dispersant (A Trademark of The Dow Chemical Company or Its Affiliates, 0.3 wt. % relative to pigment weight), 1 M NH$_4$OH (10 μL), and an aqueous solution of 3.5×10$^{-4}$ M Congo red dye or methylene blue dye (0.7 mL) were mixed at 1700 rpm in the presence of ZrO$_2$ beads (10 mm) to form a TiO$_2$ slurry. The ZrO$_2$ beads were removed from the slurry, whereupon an additional amount of dye solution (1.27 mL) was added to the slurry over time. The mixture was then mixed (3500 rpm for 3 min) to obtain 4.65 g of 75 wt. % pigment slurry.
B. 2 wt. % to 5 wt. % solids (relative to the weight of Ti-Pure-R706 in Step A) of cerium (III) carbonate (wet paste at 20% solids, prepared as described above without a capping ligand or with a capping ligand as described in Example 2) was combined with water (0.86 mL to 0.44 mL, depending on solids). The pH of the resulting solution was adjusted to pH 9 with 1M NH4OH. The mixture was sheared (3500 rpm for 4 min) followed by ultrasonication (10 min).

The slurry from Step A was mixed with stirring with an acrylic binder (12.79 g). The dispersion from Step B was mixed with the slurry from Step A and the mixture was sheared (3500 rpm for 1 min). Subsequently, ACRYSOL™ 2020E thickener (A Trademark of The Dow Chemical Company or Its Affiliates, 0.6 g) was added to the mixture and mixed (3500 rpm for 3 min) to obtain a final paint formulation at ~16% pigment volume concentration (PVC).
Preparation of Paint Formulations with Tints:
Ti-Pure-R706 TiO$_2$ (4.6 g), TAMOL™ 1124 dispersant (0.3 wt. % relative to pigment weight), 1 M NH$_4$OH (10 DeGussa P25 TiO$_2$ photocatalyst (0.36 g), Colortrend organic red 808 colorant (0.44 g) and water (1.53 g) were mixed at 2100 rpm in the presence of ZrO$_2$ beads. The ZrO$_2$ beads were removed from the slurry and the slurry was again mixed (3500 rpm, 3 min) to obtain 7 g of 75 wt. % pigment slurry. This slurry was mixed with the dispersion as described in Step B (except that the cerium (III) carbonate was prepared only in accordance with Example 2) to form a final paint formulation at having a PVC of ~16%.
UV-Induced Photodegradation of Coatings
Paint formulations were applied using a 3-mil bar applicator on polyacrylic substrates. The applied coatings were dried for 72 h under ambient conditions. Dry coatings were then irradiated under 254-nm UV light (140-150 Lux) for 4 h.

A portion of the coating (200 mg) was scraped from the polyacrylic substrate, combined with 1 mL ethanol, and ultrasonicated for 15 min. The mixture was then vortexed for 5 min and the supernatant, which contained residual dye, was analyzed by UV-vis spectroscopy to determine the degree of dye degradation.

Example 5

Dye Degradation by UV-Vis with P25

When the sample containing Ti-R706-TiO$_2$, DeGussa P25, acrylic binder, congo red dye, and cerium (III) carbonate without capping ligand was exposed to UV light as described above, the extent of dye degradation was 8%. In contrast, the extent of degradation without the cerium (III) carbonate was 40%.

Example 6

Dye Degradation by UV-Vis, without P25

When the sample containing Ti-R706-TiO$_2$, acrylic binder, methylene blue dye, and cerium (III) carbonate without capping ligand was exposed to UV light as described above, the extent of dye degradation was 0%. In contrast, the extent of degradation without the cerium (III) carbonate was 15%.

Example 7

Tint Degradation by UV-Vis with P25

When the sample containing Ti-R706-TiO$_2$, DeGussa P25, acrylic binder, organic red tint, and cerium (III) carbonate with the capping ligand as described in Example 2 was exposed to UV light as described above, color retention was found to be complete retention. In contrast, the sample without cerium (III) carbonate showed significant loss of color.

UV-Induced Photodegradation of Polymethyl Methacrylate:

A mixture of a) PMMA dissolved in CHCl$_3$ and b) cerium (III) carbonate particles (as prepared in Examples 1 or 3; 2 or 5 wt. % based on the weight of PMMA) was poured in a watch glass and allowed to dry for 16 h in ambient conditions. After 16 h drying, the PMMA films were then irradiated under 254-nm UV light (140-150 Lux) for 4 h.

Example 8

UV Photodegradation of PMMA with Cerium (III) Carbonate Capped with EDTA

No yellowing was observed for the irradiated PMMA film containing cerium (III) carbonate capped with EDTA (2 weight percent based on the weight of PMMA). In contrast, the casted film containing no cerium (III) carbonate, exhibited significant yellowing.

Example 9

UV Photodegradation of PMMA with Cerium (III) Carbonate Capped with PIDA

No yellowing was observed for the irradiated PMMA film containing cerium (III) carbonate capped with PIDA (5 weight percent based on the weight of PMMA). In contrast, the casted film containing no cerium (III) carbonate, exhibited significant yellowing.

The studies demonstrate that cerium (III) carbonate ameliorates color fading and markedly attenuates unwanted color formation in coatings prepared from coating formulations.

The invention claimed is:

1. A composition comprising an aqueous dispersion of cerium (III) carbonate particles having a z-average particle size in the range of from 5 nm to 500 nm, wherein the composition further comprises a capping ligand, which is an amine carboxylic acid or a salt thereof or an amine phosphonic acid or a salt thereof.

2. The composition of claim 1, wherein the cerium (III) carbonate particles have a z-average particles size in the range of from 50 nm to 200 nm; wherein the capping ligand is an amino acetic acid or a salt thereof or an amine phosphonic acid or a salt thereof.

3. The composition of claim 2, wherein the capping ligand is ethylene diamine tetraacetic acid, ethylene diamine diacetic acid, nitrolotriacetic acid, or N-(Phosphonomethyl) iminodiacetic acid.

4. The composition of claim 1, wherein the capping ligand is an amine carboxylic acid or a salt thereof.

5. The composition of claim 1, wherein the capping ligand is an amine carboxylic acid or a salt thereof comprising at least one amine group and at least two carboxylic acid groups.

6. The composition of claim 1, wherein the capping ligand is an amine phosphonic acid or a salt thereof.

\* \* \* \* \*